US006665944B1

United States Patent
Wei et al.

(10) Patent No.: US 6,665,944 B1
(45) Date of Patent: Dec. 23, 2003

(54) MAGNETIC MARINE COMPASS

(75) Inventors: Yu-Feng Wei, Middlesex, MA (US); Bruce Wilkinson, Gloucester, MA (US); Scott K. Batchelder, Newbury, MA (US)

(73) Assignee: Rule Industries, Inc., Gloucester, MA (US)

( * ) Notice: Subject to any disclaimer, the term of this patent is extended or adjusted under 35 U.S.C. 154(b) by 0 days.

(21) Appl. No.: 10/234,517

(22) Filed: Sep. 5, 2002

(51) Int. Cl.[7] ............................................. G01C 17/08
(52) U.S. Cl. ........................ 33/355 D; 33/1 E; 33/364
(58) Field of Search ............................. 33/355 D, 1 E, 33/355 R, 364

(56) References Cited

U.S. PATENT DOCUMENTS

| | | | | | |
|---|---|---|---|---|---|
| 1,533,683 A | * | 4/1925 | Abbot | .......................... | 33/364 |
| 1,556,557 A | * | 10/1925 | Paemelaere | ............... | 33/355 R |
| 3,805,400 A | * | 4/1974 | Giltzow et al. | ............... | 33/364 |
| 4,453,317 A | * | 6/1984 | Rahn | .......................... | 33/364 |
| 6,049,989 A | * | 4/2000 | Lee | ........................... | 33/355 R |
| 6,493,953 B1 | * | 12/2002 | Rogers | ...................... | 33/355 R |

* cited by examiner

*Primary Examiner*—Christopher W. Fulton
(74) *Attorney, Agent, or Firm*—Dickstein Shapiro Morin & Oshinsky LLP

(57) ABSTRACT

A self-balancing marine compass. A described embodiment includes a pivot assembly, a buoyant-magnetic chamber assembly, a reading card assembly, and a dome. The pivot assembly includes fulcrums, each of which fit within fulcrum holders located on an inner surface of the reading card assembly. The buoyant-magnetic chamber assembly is positively buoyant within the dome and includes pivots meeting with pivot axes of the fulcrum holders. This embodiment is also a no spin compass.

8 Claims, 5 Drawing Sheets

Lines of Equal Dip for 1965

MAGNETIC MARINE COMPASS

FIELD OF THE INVENTION

The invention generally relates to magnetic marine compasses and more particularly to magnetic marine compasses that have tilting, self-balancing and no-spin characteristics.

BACKGROUND

A significant issue regarding compasses, whether land-based or marine, is the issue of dip. In certain locations in the globe, due to the position of the compass relative to the north and south poles, the magnet used in compasses will dip toward or away from the ground. FIG. 1 illustrates the phenomenon of dip. Typical magnetic compasses include a magnet coupled with a compass card. As noted above, at certain latitudes the magnet, and hence the compass card, dip. Specifically, FIG. 1 shows a two-dimensional representation 10 of a portion of the globe with latitude lines 12, 14 and 16. For traditional magnetic compasses, the magnet and the compass card 18 are pivotably mounted on a pin 19, dip downwardly in areas around latitude line 12, and dip upwardly in areas around latitude 16. Around the equator, latitude line 14, the magnet and compass card 18 dip imperceptibly or not at all. If the dip in certain latitudes is too pronounced, the compass card 18 will be at such an angle that viewing the numbers on the card is rendered difficult. FIG. 2 shows a more realistic representation of lines of equal dip 24 found on the globe.

Decoupling the magnet from the card is one attempt to introduce self-balancing to compasses. Referring to FIG. 1, a compass card 20 does not dip at latitude lines 12 and 14, but a decoupled magnet 22 does. There are numerous commercially available magnetic compasses with the magnet decoupled from the card. One type is an orienteering magnetic compass. Such a compass is generally used on land by hikers and others to orient themselves with their environment. One manufacturer of orienteering magnetic compasses is Suunto, of Finland, which makes the MC-2G global compass (FIGS. 4a and 4b). As shown in FIG. 4a, the orienteering compass 40 includes a compass card 42, a magnet 44, a magnet holder 45 with trunnions 46, a card case 48, and a pair of jewels 50, 52. The magnet holder 45 encircles the bar magnet 44 and the trunnions 46 hold the magnet 44 to the card 42. The jewels 50, 52 allow the card 42 and magnet 44 to freely swing. FIG. 4b shows an alternative orienteering compass 60 that includes a bar magnet 62 held to the card 42 via trunnions 46 extending from a magnet holder 64.

An advantage to the orienteering magnetic compasses 40 and 60 is that the magnet 44, 62 is decoupled from the card 42. There are several disadvantages in the use of orienteering compasses in marine environments. One major disadvantage is that to properly function, orienteering compasses must be level, which severely impacts their ability to be used in marine environments. Since orienteering compasses are virtually only land use compasses, their manufacture is less robust than the manufacture of marine compasses. Thus, there has not been a more robust manufacture of a marine compass having a card decoupled from a magnet.

Another form of magnetic compass is a manual-balance type. This type of compass is properly balanced to function within a certain magnetic latitude. Weight is added to the compass card to level the card. However, manual balancing of compasses is labor intensive and time consuming. Further, such manually balanced compasses are capable of functioning in only a limited part of the world.

Another type of magnetic compass is a counter-weight type, which utilizes the weight of the compass card itself to counter the dipping magnetic force and maintain the dipping angle within an acceptable range. One manufacturer of counter-weight types of compasses is C. Plath, which makes the Venus® compass 70 (FIG. 5). The Venus® compass 70 lessens the dipping by lowering the magnet from the pivot point of the compass card. Thus, the weight of the magnet compensates for the vertical magnetic force causing the dip and allows the card to reach an equilibrium dipping angle with is generally smaller than would have occurred otherwise.

One disadvantage with the counter-weight type of compass is that to provide sufficient moment for the weight of the magnet to counter-balance the dipping force, the magnet must be moved a fairly substantial distance from the pivot point of the card. Referring to FIG. 3, the equilibrium equation for a compass card is:

$$M = (W)(d)(\sin\Theta)$$

where M is the vertical couple or moment, W is the weight of the compass card assembly, d is the depth of the center of gravity, and $\Theta$ is the dip angle of the compass card. Thus, to move the depth d of the center of gravity Cg of the compass card assembly 30 (including a card 32 and a magnet 34 which pivot about pivot point P), the magnet 34 must be moved away from the card 32. Such compasses must be taller than other compasses, which adds manufacturing costs and prevents such compasses from being placed in certain locations with limited height.

Another significant issue regarding the use of compasses is that compasses used in marine environments invariably encounter spin. Virtually all compass cards spin under some horizontal vibration frequencies, which are encountered when compasses are mounted on powered vehicles. The difference in inertia between the compass card and fluid within which the compass card is positioned causes relative movement. The relative movement in turn causes contact at the pivot point that leads to friction that drags the compass card in a circular path. Ultimately, the compass card will spin resonantly at some vibration frequencies. Spinning of compass cards inhibits users from properly reading the orientation from the compass.

Rule Industries, Inc., the assignee of this patent application, manufactures a compass under the trademark AQUAMETER® which exhibits no-spin characteristics. The AQUAMETER® compasses, however, lack the ability to self-balance. There are no compasses that exhibit the characteristics of no-spin and self-balance.

SUMMARY

The invention provides a no spin, self-balancing marine compass that includes a pivot assembly, a buoyant-magnetic chamber assembly positioned over the pivot assembly, a reading card assembly surrounding the buoyant-magnetic chamber assembly, a dome encompassing the buoyant-magnetic chamber assembly, the reading card assembly, and the pivot assembly, and fluid within the dome. The buoyant-magnetic chamber assembly is positively buoyant within the fluid, and the buoyant-magnetic chamber assembly, the reading card assembly, and the pivot assembly achieve a near neutral buoyancy within the dome, thereby mitigating spin of the buoyant-magnetic chamber assembly relative to the dome.

These and other advantages and features of the invention will be more readily understood from the following detailed

DETAILED DESCRIPTION OF PREFERRED EMBODIMENTS

Figure 1:
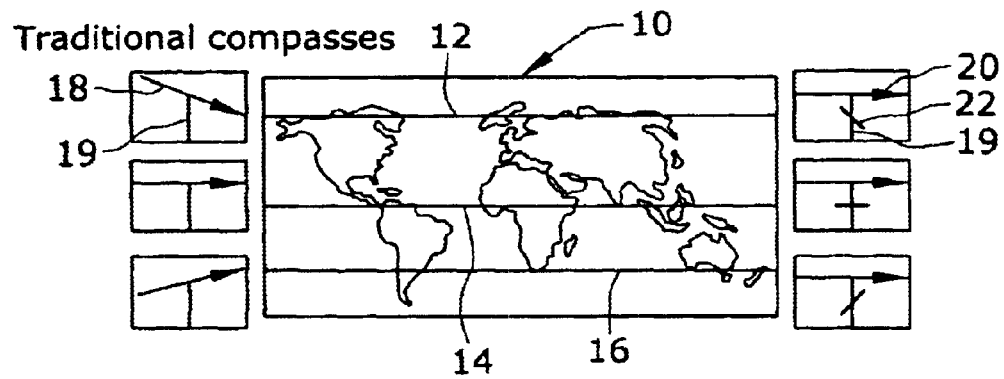
FIG. 1 illustrates the concept of magnetic dip at various latitudes.
Figure 3:
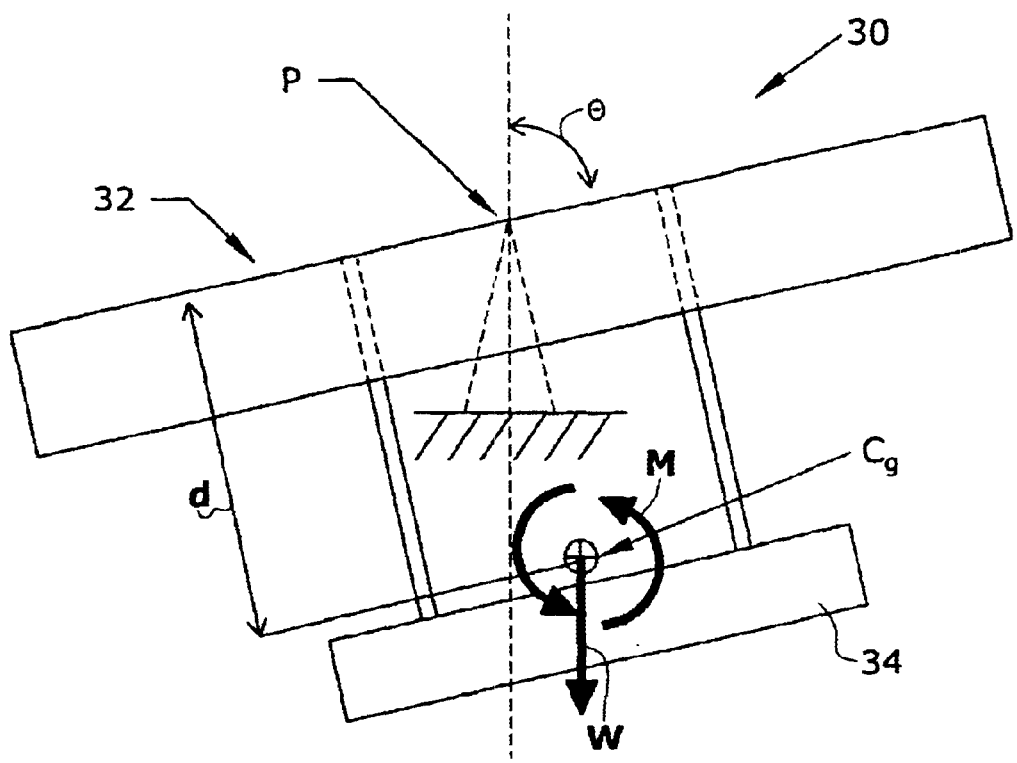
FIG. 3 is a schematic representation of a magnetic card compass in use and exhibiting magnetic dip.
Figure 2:
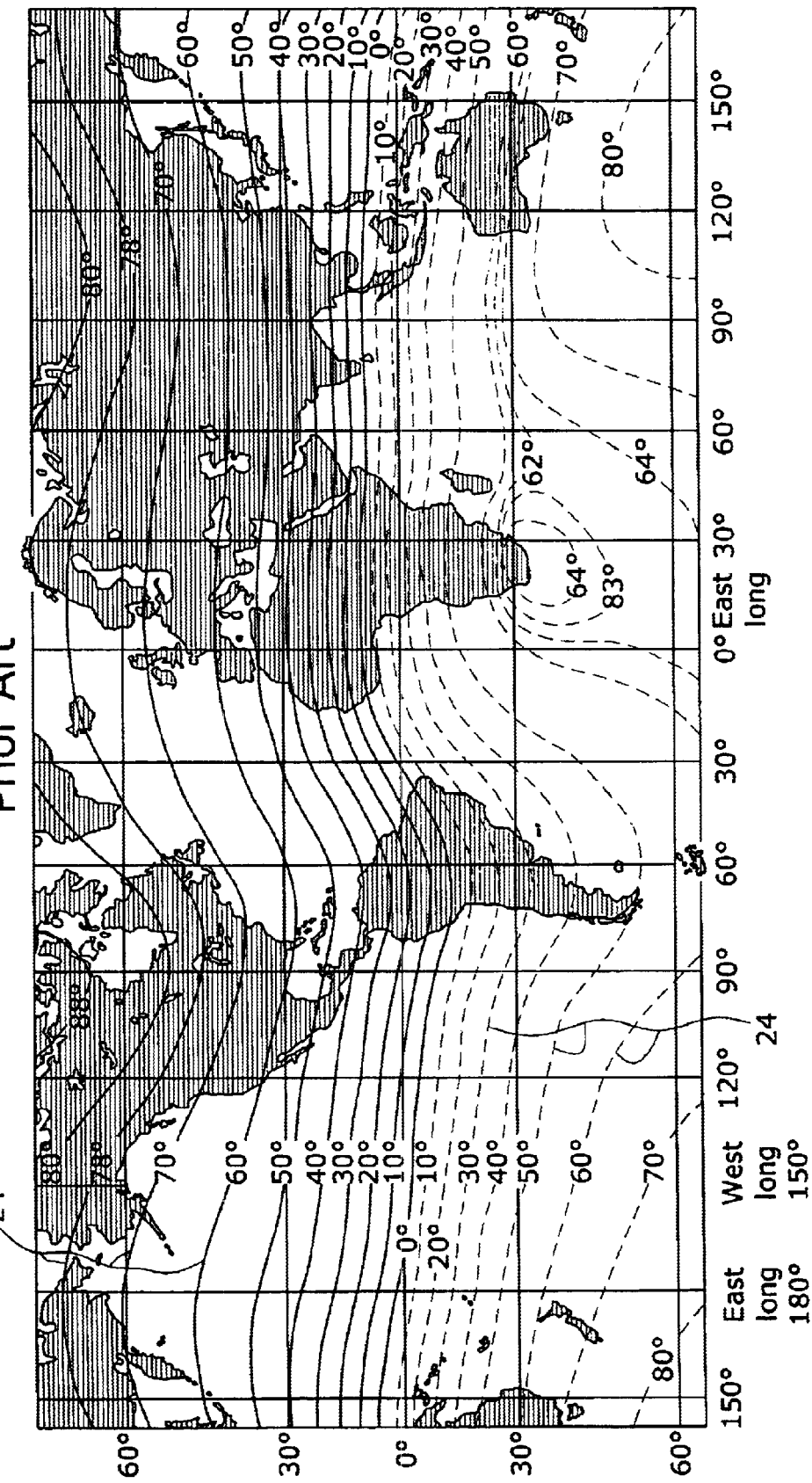
FIG. 2 more specifically illustrates that magnetic dip varies across the globe.
Figure 4A:
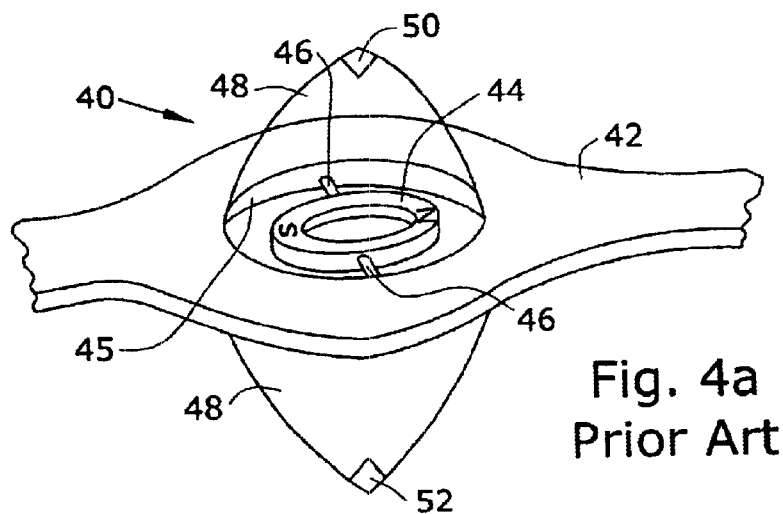
FIG. 4a illustrates a conventional orienteering compass.
Figure 4B:
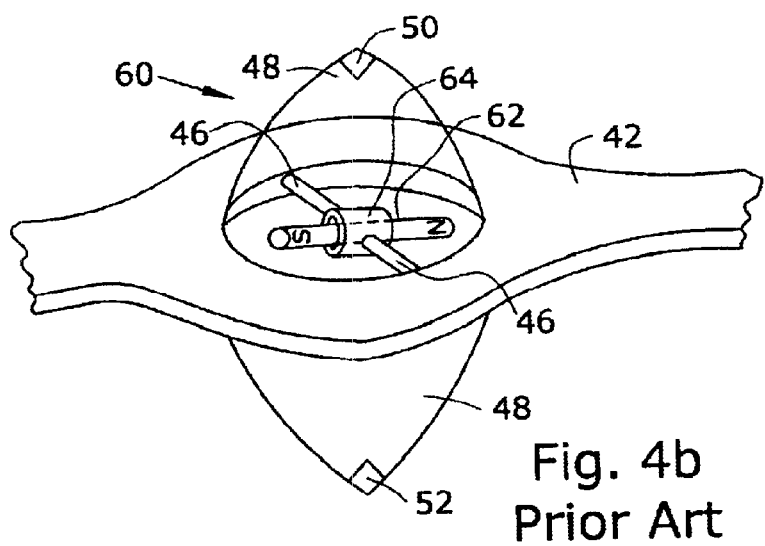
FIG. 4b illustrates another conventional orienteering compass.
Figure 5:
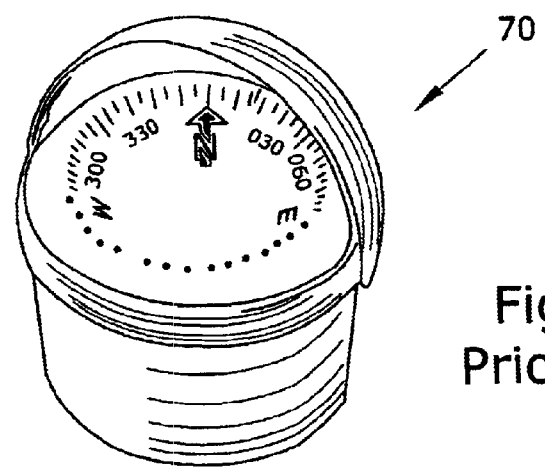
FIG. 5 illustrates a conventional counter-weight type of magnetic card compass.
Figure 6:
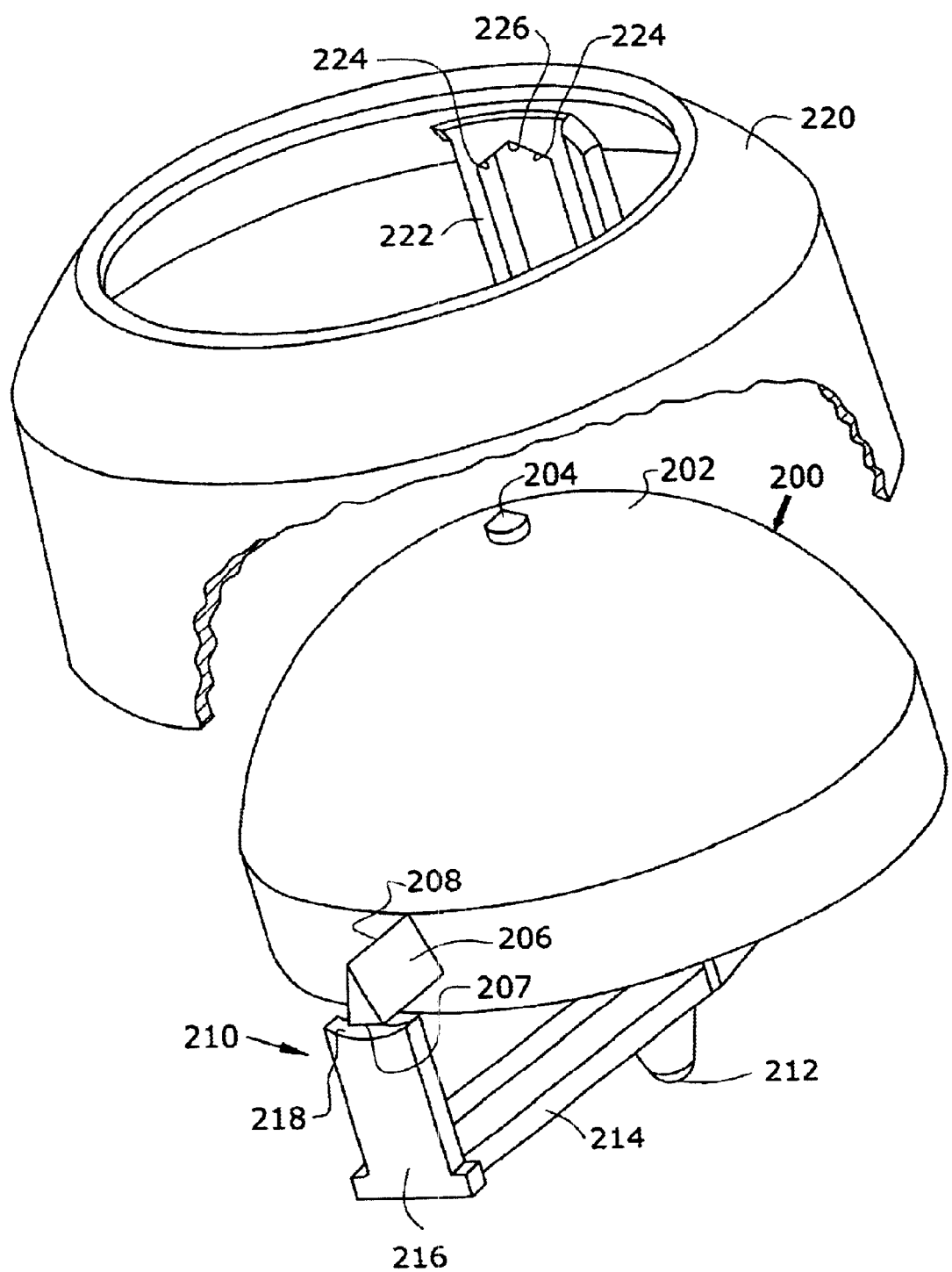
FIG. 6 is a perspective view of a magnetic assembly constructed in accordance with an embodiment of the invention.
Figure 7:
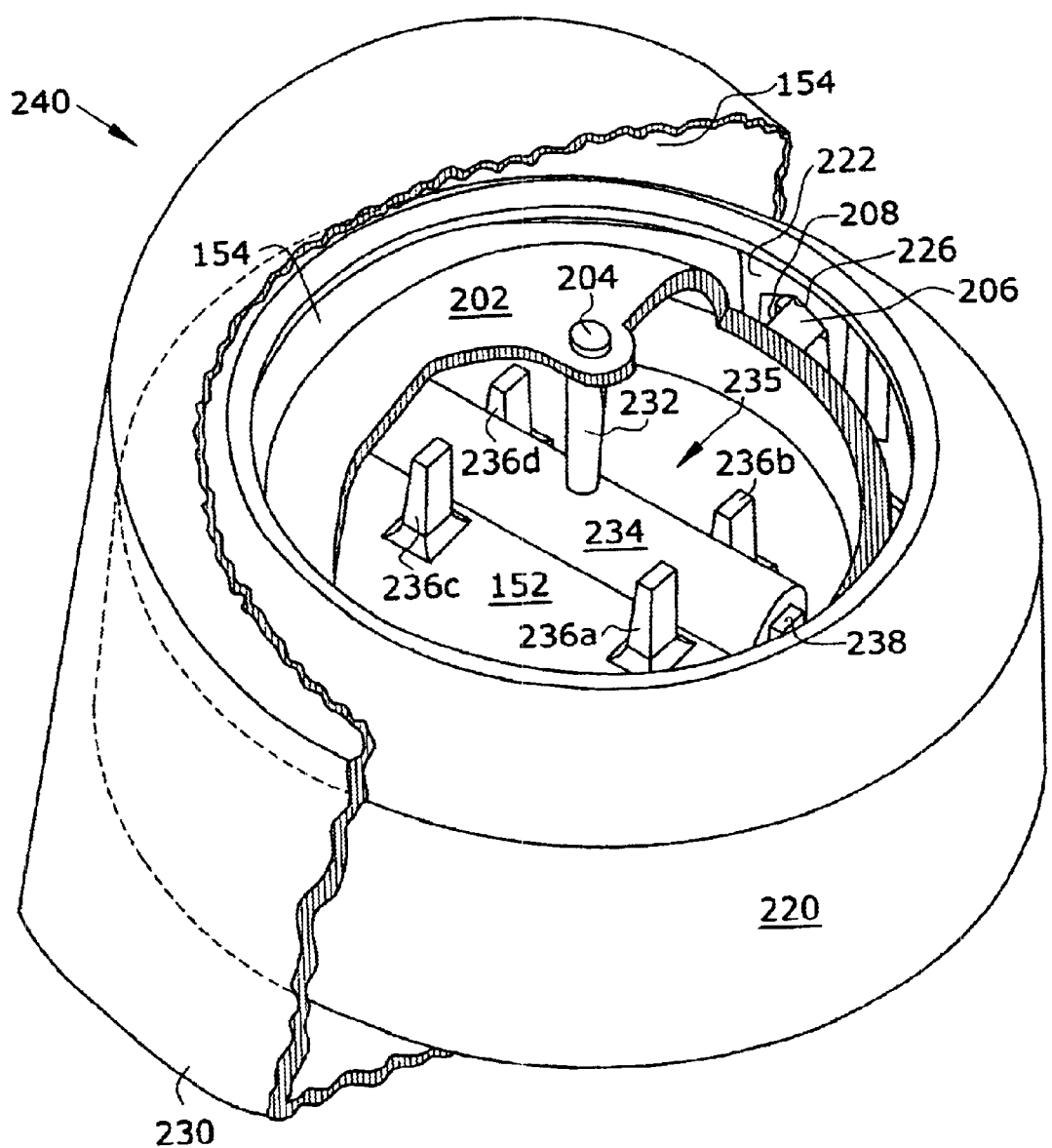
FIG. 7 is a partial perspective view illustrating the assembly of FIG. 6.

With specific reference to FIGS. 6–7, in which like reference numerals refer to like elements, a magnetic card compass 240 (FIG. 7) is illustrated. The compass 240 includes a buoyant magnetic chamber ("BMC") assembly 200, a pivot assembly 210, a reading card assembly 220 and a dome 230 (FIG. 6).

The BMC assembly 200 includes a card body 202 and a magnet 234 (FIG. 7). Extending out of the card body 202 are a pair of pivots 206 (only one of which is shown in FIG. 6). The pivots 206 have a pivot edge 208 opposite from a curved surface 207. At an upper portion of the card body 202 is a card stop 204.

A magnet anchoring assembly 235 is included within the BMC assembly 200. As illustrated, a plurality of stanchions 236a–d (FIG. 7) are positioned to hold the magnet 234 in place within the inner card assembly 200. While four stanchions 236a–d are illustrated, it should be appreciated that any number of stanchions that is suitable to hold the magnet 234 in place may be used. Further, other structures such as ledges or lips may be used instead of the stanchions 236a–d. Further, the magnet 234 is held in place with anchors 238. Finally, a dowel 232 prevents the magnet 234 from rising up and out of the confines of the stanchions 236a–d and the anchors 238. Air 152 fills the interior of the card body 202. As will be described in greater detail below, the BMC assembly 200 is to be positively buoyant when in use.

The pivot assembly 210 includes a pivot arm 214 extending between a pair of fulcrums 216 (only one of which is shown in FIG. 6). Each fulcrum 216 includes an arced surface 218 which loosely aligns with the curved surface 207 of the pivots 206. The arced surface 218 traps the curved surface 207 of the pivots 206, inhibiting lateral movement of the pivots 206 away from the curved surfaces 207. The positive buoyancy of the BMC assembly 200 inhibits the curved surfaces 207 from resting on the arced surfaces 218. Extending downwardly from the pivot arms 214 is a pivot device 212, which allows horizontal aligning of the BMC assembly 200 relative to the North/South magnetic axis.

The BMC assembly 200 fits into the reading card assembly 220 (FIG. 6). The reading card assembly 220 includes a pair of fulcrum holders 222. The fulcrum holders 222 each have slanted surfaces 224 which meet at a pivot axis 226. The fulcrums 216 of the pivot assembly 210 are installed within the fulcrum holders 222, with the pivots 206 of the BMC assembly 200 positioned between the arced surfaces 218 and the slanted surfaces 224. The positive buoyancy of the BMC assembly 200 in use causes an upwardly directed force which allows the pivot edges 208 to meet the pivot axes 226, enabling the BMC assembly 200 to dip. Thus, with the pivot edges 208 in contact with the pivot axes 226, and the arced surfaces 218 held within the fulcrum holders 222 close to the curved surfaces 207, the BMC assembly 200 is held within the reading card assembly 220.

The dome 230 encompasses the BMC assembly 200 and the reading card assembly 220. Further, though not illustrated, the reading card assembly 220 includes directional markers, such as "N" for north, and degree markers, and the dome 230 includes a lubber line. Also not illustrated is a pivot receiver for receiving the pivot device 212.

Fluid, preferably oil, 154 fills up the space within the dome 230. The weight of the BMC assembly 200, the reading card assembly 220, and the pivot assembly 210 offset the weight of the fluid 154 displaced by these assemblies. Combined, the BMC assembly 200, the reading card assembly 220, and the pivot assembly 210 are slightly negatively buoyant or almost neutrally buoyant within the dome 230. By creating slightly negative or near neutral buoyancy for the combination of the BMC assembly 200, the reading card assembly 220, and the pivot assembly 210, these assemblies sit on the pivot receiver that receives the pivot device 212. Further, a transfer of torque created by horizontal vibrations to the pivot device 212 is reduced, thereby inhibiting spin of the BMC assembly 200.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A no spin, self-balancing marine compass, comprising:
    a pivot assembly;
    a buoyant-magnetic chamber assembly positioned over said pivot assembly;
    a reading card assembly surrounding said buoyant-magnetic chamber assembly;
    a dome encompassing said buoyant-magnetic chamber assembly, said reading card assembly, and said pivot assembly; and
    fluid within said dome, wherein said buoyant-magnetic chamber assembly is positively buoyant within said fluid and wherein said buoyant-magnetic chamber assembly, said reading card assembly, and said pivot assembly achieve a near neutral buoyancy within said dome, thereby mitigating spin of said buoyant-magnetic chamber assembly relative to said dome.

2. The marine compass of claim 1, wherein said pivot assembly includes:
    a pivot arm extending between a pair of fulcrums, said fulcrums each having an arced surface; and a pivot device extending from said pivot arm.

3. The marine compass of claim 2, wherein said buoyant-magnetic chamber assembly includes:

a card body; and a pair of pivots, each said pivot extending out from said card body and having a pivot edge opposite a curved surface, each said curved surface being positioned over a respective said arced surface of said fulcrums.

4. The marine compass of claim 3, wherein said buoyant-magnetic chamber assembly further includes a magnet anchoring assembly.

5. The marine compass of claim 4, wherein said magnet anchoring assembly includes:

a plurality of stanchions surrounding said magnet;

a pair of anchors, one at each end of said magnet; and a dowel extending from an upper portion of said card body toward said magnet.

6. The marine compass of claim 5, wherein said magnet anchoring system includes four stanchions, two each on opposing sides of said magnet.

7. The marine compass of claim 3, wherein said outer housing includes a pair of fulcrum holders, each said fulcrum holder having a pair of slanted surfaces meeting at a pivot axis, wherein each said fulcrum and each said pivot fits within a respective one of said fulcrum holders such that each said pivot edge meets with a respective one of said pivot axes.

8. The marine compass of claim 1, wherein said fluid comprises oil.

* * * * *